(12) United States Patent
Karlsson (10) Patent No.: US 9,988,267 B2
(45) Date of Patent: Jun. 5, 2018

(54) MIXING DEVICE FOR A FUEL REFORMER FOR CONVERTING HYDROCARBON FUELS INTO HYDROGEN RICH GAS

(71) Applicant: POWERCELL SWEDEN AB, Göteberg (SE)

(72) Inventor: Anders Karlsson, Mölndal (SE)

(73) Assignee: POWERCELL SWEDEN AB, Göteborg (SE)

( * ) Notice: Subject to any disclaimer, the term of this patent is extended or adjusted under 35 U.S.C. 154(b) by 78 days.

(21) Appl. No.: 14/800,760

(22) Filed: Jul. 16, 2015

(65) Prior Publication Data

US 2015/0315018 A1 Nov. 5, 2015

Related U.S. Application Data

(62) Division of application No. 13/386,062, filed as application No. PCT/SE2009/000374 on Jul. 23, 2009, now Pat. No. 9,114,986.

(51) Int. Cl.
| | |
|---|---|
| *C01B 3/38* | (2006.01) |
| *B01J 19/24* | (2006.01) |
| *B01J 4/00* | (2006.01) |
| *C01B 3/36* | (2006.01) |
| *H01M 8/0612* | (2016.01) |

(52) U.S. Cl.
CPC ............ *C01B 3/38* (2013.01); *B01J 4/002* (2013.01); *B01J 4/005* (2013.01); *B01J 19/248* (2013.01); *B01J 19/2485* (2013.01); *B01J 19/2495* (2013.01); *C01B 3/363* (2013.01); *C01B 3/382* (2013.01); *H01M 8/0631* (2013.01); *B01J 2219/00103* (2013.01); *B01J 2219/00117* (2013.01); *B01J 2219/1923* (2013.01); *B01J 2219/1941* (2013.01); *B01J 2219/1947* (2013.01); *B01J 2219/2419* (2013.01); *B01J 2219/2422* (2013.01); *C01B 2203/0244* (2013.01); *C01B 2203/1023* (2013.01); *C01B 2203/1235* (2013.01); *C01B 2203/1276* (2013.01); *F01N 2240/30* (2013.01); *Y02E 60/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,201,029 | B1 * | 3/2001 | Waycuilis | C01B 3/382 252/373 |
| 2003/0233789 | A1 * | 12/2003 | Dauer | B01J 8/0221 48/197 R |

(Continued)

*Primary Examiner* — Imran Akram
(74) *Attorney, Agent, or Firm* — WRB-IP LLP (57) ABSTRACT

A mixing device for a fuel reformer for mixing at least two fluids is provided. The mixing device includes at least a first plurality of holes which is arranged along a first row, and a second plurality of holes which is arranged along a second row. The mixing device can be used in a fuel reformer for converting hydrocarbon fuel into hydrogen rich gas by auto-thermal reaction process having a, preferably cylindrically shaped and double walled, housing with two side walls forming a reaction chamber of the fuel reformer, wherein hydrocarbon fuel and an oxidizing agent are mixed by the mixing device.

19 Claims, 4 Drawing Sheets

(56) References Cited

U.S. PATENT DOCUMENTS

| | | | | |
|---|---|---|---|---|
| 2005/0188615 A1* | 9/2005 | Sennoun | ............... | B01J 8/0438 48/127.9 |
| 2006/0021280 A1* | 2/2006 | Hamilton | ............... | B01J 8/0285 48/127.9 |
| 2007/0107307 A1* | 5/2007 | Kirwan | ............... | B01J 8/0438 48/127.9 |
| 2007/0107308 A1* | 5/2007 | Bonadies | ............... | B01J 8/0221 48/198.7 |
| 2007/0113476 A1* | 5/2007 | Thomas | ............... | B01B 1/005 48/198.7 |
| 2010/0175379 A1* | 7/2010 | Liu | ............... | F02C 3/20 60/723 |

* cited by examiner

MIXING DEVICE FOR A FUEL REFORMER FOR CONVERTING HYDROCARBON FUELS INTO HYDROGEN RICH GAS

The present application is a divisional of U.S. application Ser. No. 13/386,062, which had a filing date of Feb. 3, 2012, and which was the U.S. national stage of PCT/SE2009/00374, filed Jul. 23, 2009, both of which are incorporated by reference.

The present invention relates to a fuel reformer with a mixing device for converting hydrocarbon fuels into hydrogen rich gas for fuel cells and/or exhaust treatment applications.

In the state of the art it is well known to produce hydrogen rich gas for the use in fuels cells of transportation devices by reforming hydrocarbon fuels, like gasoline or hydrocarbon fuels. Conventionally, hydrogen is produced in large-scale industrial facilities and then stored on board of the transportation devices. The recent development of small-scale on-board hydrogen sources, so called fuel reformers, provides a possibility for producing hydrogen on demand without the necessity of hydrogen storage.

In general, there are three known methods of reforming gaseous or liquid hydrocarbon fuels into hydrogen: catalytic steam reforming, partial oxidation reforming and auto-thermal reforming. In all known methods two fluids, namely hydrocarbon fuel and an oxidizing agent, such as steam, air or water, are mixed and supplied to a catalyst arranged in a reaction chamber of a fuel reformer.

In catalytic steam reforming processes, a mixture of steam and hydrocarbon fuel is exposed to a suitable catalyst, like nickel, at a high temperature (typically between 700° C. and 1000° C.). The reaction is highly endothermic and requires an external source of heat and a source of steam.

In partial oxidation reforming processes, a mixture of hydrogen fuel and an oxygen containing gas, like ambient air, are fed as feed gas into a reaction chamber, preferably in the presence of a catalyst. The catalyst used is normally made from a noble metal or nickel, and the temperature is typically between 700° C. and 1700° C. The reaction is highly exothermic and, once started, it generates sufficient heat to be self sustaining. In order to promote the oxidation reaction, it is necessary to reduce temperature variations in the reaction chamber.

Auto-thermal reforming processes are a combination of steam reforming and partial oxidation reforming. Waste heat from the partial oxidation reforming reaction is used to heat the endothermic steam reforming reaction.

The natural by-products of all reforming processes are carbon monoxide and carbon dioxide. But, since the hydrocarbon fuels were not designed as a feed stock for generating hydrogen, there are also other by-products such as sulphur. These byproducts may be harmful to the fuel cells and should therefore be removed by subsequent steps outside the fuel reformer. Additionally, hydrocarbon fuels, especially diesel, can produce soot as a by-product in the catalyst, if the mixing in the reaction chamber is poor. Soot particles again, are very harmful to the fuel cells, and care must be taken to avoid the formation of soot in the fuel reformer.

From the state of the art, U.S. Pat. No. 6,770,106, a partial oxidizing fuel reformer for reforming feed gas containing hydrocarbon or methane, oxygen and water, is known, wherein the reduction of temperature variations is achieved by a reaction chamber being covered with a passage for feed gas, which is heated by the reaction heat in the reaction chamber and therefore thermally isolates the reaction chamber. Thereby, temperature variations inside the reaction chamber can be reduced. For heating the feed gas, the reaction heat can be recovered by a heat exchanger.

Additionally, it has been found that a successful and efficient conversion of the feed gas into a hydrogen rich gas is dependent on a successful mixing of the fluids or reactants, namely hydrocarbon fuel and the oxidizing agent. The disadvantage of the known state of the art is that, since the mixing of the reactants is performed in a further, externally arranged mixer, a perfect atomization or vaporization of the hydrocarbon fuel and the oxidants without condensation of the fuel in the reaction chamber of the fuel reformer cannot be provided.

For solving this problem it has been proposed in the state of the art e.g. to mix hydrocarbon fuel and oxidizing agent in the reaction chamber and, preferably, even to vaporize injected hydrocarbon fuel by preheating the incoming air stream to be mixed with the fuel, or by preheating a reaction chamber surface for receiving a fuel spray. None of the prior art approaches is entirely successful in providing a reliable, complete vaporization of the injected hydrocarbon fuel and a homogenous mixing of the hydrocarbon fuel and the oxidizing agent. The main problem arising by the mixing of hydrocarbon fuel and an oxidizing agent is to provide a homogenous gaseous mixing of the two fluids, wherein at least one of the fluids, particularly hydrocarbon fuel, is provided in its liquid phase.

Another disadvantage of the mixing as performed in the state of the art is the generation of a recirculation of the fluid streams. This recirculation is generated, as the fluid flow, which is provided by the injection of hydrocarbon fuel and/or of the oxidizing agent into the reaction chamber, hits the catalyst arranged in the reaction chamber and is repelled therefrom. This recirculation can even produce a backflow of the fluids through the fluid inlets.

Therefore, it is object of this invention to provide a mixing device for a fuel reformer for converting hydrocarbon fuels into hydrogen rich gas, wherein a higher degree of homogenous mixing of the reactants is provided and recirculation is reduced.

It has been discovered by the inventor that the recirculation of the fluids can be reduced by using a mixing device, which has at least a first plurality of holes arranged along a first row and a second plurality of holes arranged along a second row. By means of the first and the second rows of holes fluid jets are provided downstream of the mixing device. By means of the generated fluid jets, recirculation can be controlled and the mixing of said fluids be improved. The shape of the rows preferably resembles the shape of an outer edge of the mixing device, whereby the circumference of the first row advantageously is smaller than the circumference of the second row. Thereby, the mixing device establishes a so called plug flow, which streams almost planar and substantially in parallel to a longitudinal axis of a reaction chamber, the mixing device can be mounted in or at.

Preferably, the mixing device is designed such that the number, the size and/or the arrangement (rows) of the holes of the first and the second plurality of holes is/are optimized for a shape and/or a size of a fuel reformer the mixing device is designed for.

In another preferred embodiment of the mixing device, the mixing device is designed such that the holes of the first plurality of holes are arranged in flow direction of the oxidizing agent streaming through e.g. oxidizing agent inlets of a reaction chamber of a fuel reformer. It is further advantageous to arrange the holes of the second plurality of holes, preferably alternating to the holes of the first plurality of holes, at the periphery of the mixing device.

In this preferred embodiment of the mixing device, the number of holes of the first plurality of holes is equal to the number of holes of the second plurality of holes. By this arrangement, the mixing device can be divided into segments, wherein the segments either comprise a hole of the first plurality of holes or a hole of the second plurality of holes. The size of the segments preferably depends on the overall size of the mixing device and the overall number of holes.

plurality of holes and/or the diameter of the second plurality of holes is preferably defined by the overall number of holes and the size of the mixing device.

According to a further preferred embodiment of the mixing device, the mixing device has a preferably centrally located opening, which is adapted to encompass, preferably in a sealing manner, a fuel injection element of the fuel reformer. Through this fuel injection element, preferably preheated hydrocarbon fuel is sprayed into the reaction chamber of such a fuel reformer, where it mixes with the oxidizing agent streaming through the holes of the mixing device.

Preferably, the holes of the first plurality of holes are arranged around the centrally located opening. Since hot oxidizing agent streams through the holes of the first plurality of holes, its waste-heat supports the vaporization of the hydrocarbon fuel.

For increasing the homogeneity of the mixing, it is further preferred to provide at least one hole of the second plurality of holes with a shroud. These shrouds provide a swirling motion of the oxidizing agent downstream of the mixing device which further increases the turbulence of the fluid jets and thereby improves the homogenous mixing of the hydrocarbon fuel and the oxidizing agent.

In a further embodiment of the mixing device, the ratio of the diameter of one of the first plurality of holes to the diameter of the first row is proportional to $\tan(\beta/2)$ and/or the ratio of the diameter of one of the second plurality of holes to the diameter of the second row is proportional to $\tan(\alpha/2)$, wherein angle $\beta$ defines a first type of segment and angle $\alpha$ defines a second type of segment of the mixing device. Angle $\alpha$ defines the size of a segment comprising one hole of the second plurality of holes and angle $\beta$ defines the size of a segment comprising one hole of the first plurality of holes. The angles $\alpha$ and $\beta$ and the number of holes are interrelated, wherein the angles $\alpha$ and $\beta$ can be equal and/or relate to the number of holes by the equation $n_1 \cdot \alpha + n_2 \cdot \beta = 360°$, with n1 being the number of holes of the first plurality of holes and n2 being the number of holes of the second plurality of holes. The invention is not limited to the case of two such rows with a plurality of holes each being arranged at the mixing device. There could be even three or more rows of such pluralities of holes being arranged at the mixing device.

In case there is for instance a third row of holes defining a third plurality of holes, the size of the segment comprising one hole of the third plurality of holes would be defined by an angle y. In this case, the segments and number of holes would relate to each other by the equation $n_1 \cdot \alpha + n_2 \cdot \beta + n_3 \cdot y = 360°$ with n1 being the number of holes of the first plurality of holes, n2 being the number of holes of the second plurality of holes and n3 being the number of holes of the third plurality of holes. Thus, in general, segment size and number of holes relate to each other according to the formula $$\sum_{i}^{Number\ of\ rows} n_i \cdot \alpha_i = 360°.$$

According to a further preferred embodiment of the mixing device, the mixing device has a circular shape and the first and/or second row/s of holes are/is preferably formed as circle/s, too. Advantageously, the shape of the mixing device is defined by the reaction chamber it is mounted in or at. With other words, if the reaction chamber has a quadratic cross section, also the mixing device is preferably quadratic, and if the reaction chamber is tubular shaped (i.e. circular or elliptical shaped), as most fuel reformers are, the mixing device has preferably a tubular, i.e. circular or elliptic shape, too.

It is further advantageous to provide a fuel reformer having a reaction chamber, wherein the above described mixing device according to the invention is arranged in a sealing manner inside the reaction chamber. In such an arrangement, the mixing device provides a substantially planar fluid flow which corresponds to an axial fluid flow along the longitudinal axis of the fuel reformer. Since the planar fluid flow is designed to use the whole cross section of the reaction chamber, fluid mainly streams in a controllable (and controlled) manner in one direction through the reaction chamber, whereby a recirculation of the fluid flow is reduced.

In a further preferred embodiment of the fuel reformer, the mixing device is arranged near a fuel inlet side of the fuel reformer and the oxidizing agent inlets are preferably arranged between the fuel injection inlet side of the fuel reformer and the mixing device. By this arrangement a pressure is established in the space between the fuel injection inlet side and the mixing device which forces the oxidizing agent to flow through the holes of the mixing device in downstream direction, which further reduces the risk that unwanted backflow or recirculation of the fluid stream occur.

Preferably, the oxidizing agent inlets form slits which are arranged along the circumference of the fuel reformer. Advantageously, the slits or the mixing device are designed such that the slits and the holes of the second plurality of holes of the mixing device are arranged off-line relative to each other.

This off-line arrangement of the holes of the second plurality of holes and the slits ensures that during the start up phase the oxidizing agent, preferably even a major part thereof, streaming into the reaction chamber of the fuel reformer also reaches the holes of the first plurality of holes at the mixing device. If the slits were to be radially arranged in line with the holes of the second plurality of holes of the mixing device, the major part of oxidizing agent would stream directly through the holes of the second plurality of holes. This in turn would impair the establishment of a plug flow already during the start-up phase. After having reached a steady state, the oxidizing agent streams through both the first plurality of holes and the second plurality of holes, wherein due to smaller diameter of the holes of the first plurality of holes, the major part of the oxidizing agent streams through the second plurality of holes.

Any of the embodiments of the mixing device described above can be mounted inside the reaction chamber of such fuel reformer according to the invention.

According to another aspect of the invention regarding the fuel reformer, a substantially complete fuel atomization and subsequent gas mixture can be achieved by pre-heating the hydrocarbon fuel before introducing the hydrocarbon fuel into the fuel reformer, in particular into the mixing device arranged in such fuel reformer, and mixing it there with the oxidizing agent. Such a preheating can be achieved by preheating means which could be arranged outside of the reaction chamber of the fuel reformer. The preheating means can be a separate device being arranged upstream to a fuel inlet, but it is also possible to integrate the fuel inlet and the preheating means into a single device. Particularly, in the preferred case, where a fuel injector is used as fuel inlet, it is advantageous to heat the injector, whereby the fuel is preheated, too. Further, in another preferred embodiment the fuel inlet is in heat conductive contact with a side wall of the reaction chamber and/or the mixing device, which in turn makes it possible to transfer the heat generated in the reaction chamber to the injector for preheating the fuel.

In a further preferred embodiment of the fuel reformer, the temperature of the preheated fuel is adapted to be close to, but below the lowest boiling point of the fuel, whereby a fuel temperature required for substantially complete atomization or vaporization is provided.

According to a further advantageous embodiment of the fuel reformer, also the oxidizing agent is preheated prior to the mixing with the hydrocarbon fuel, preferably to a temperature in the same range or higher than the temperature of the preheated fuel. This substantially prevents unwanted condensation of the fuel or the oxidizing agent, which could result in a shortened life time of the fuel reformer.

The preheating of the oxidizing agent can be preferably performed by using a fuel reformer having an inner wall and an outer wall forming a space in-between, wherein said space is designed as oxidizing agent passage between an oxidizing agent supply port provided in or at the outer wall of the fuel reformer and an oxidizing agent inlet provided in or at the inner wall of the fuel reformer. The inner wall is heated by the heat of the chemical reactions taking place inside the reaction chamber, whereby in turn the oxidizing agent is preheated by the inner wall by heat transfer from the inner wall to the oxidizing agent. An advantageous side effect of the heating of the inner wall is that in case a spray of liquid fuel comes into contact with the inner wall, the heat provided by the inner wall supports evaporation of the liquid fuel.

According to a further preferred embodiment of the fuel reformer, the preheating of the oxidizing agent is additionally or alternatively performed by an externally arranged heater. This is particularly advantageous during a start-up phase of the fuel reformer, where the reaction chamber needs to be heated up to its normal operating temperature. Due to the double walled structure provided by the arrangement of the oxidizing agent passage, the heat of the preheated oxidizing agent can be provided to the inner wall and thereby to the reaction chamber, whereby the time required for the heating up of the fuel reformer can be reduced.

The combination of fuel preheating and mixing the atomized fuel with the oxidizing agent downstream of the mixing device results in a substantially completely homogenous reactant mixture, and preheating of the oxidizing agent reduces unwanted condensation effects. The achieved substantially homogenous mixture allows for a substantially complete conversion of the hydrocarbon fuel which in turn allows for an efficient production of hydrogen rich gas from converted heavy hydrocarbon fuel which in turn is a prerequisite for the subsequent production of fuel cell grade hydrogen.

An advantageous side effect of the above described preheating of the oxidizing agent by heat transfer from the inner wall of the reaction chamber to the oxidizing agent is that the heat transfer also cools the inner wall to a temperature, at which the formation of soot by burning of fuel particles coming in contact with the inner walls is substantially reduced.

Generally, there is the possibility of providing the reaction chamber with an external cooling device but this increases the dimensions of the reaction chamber and adds a further consumer of energy to the system (that has to be supplied with energy produced e.g. by the fuel cells). Therefore, it is usually more advantageous to use the relatively cool oxidizing agent for cooling the inner wall of the reaction chamber. Such a solution has the further advantage that a thermal isolation of the inner wall is in most applications not necessary, whereby the overall dimensions of the fuel reformer can be further reduced.

Another advantage of the cooling of the inner wall by the oxidizing agent is that the temperature inside the reaction chamber can be held substantially constant, and that the temperature of the oxidizing agent can be controlled.

As shown in another preferred embodiment of the fuel reformer, the oxidizing agent inlet provided in the inner wall of the housing is formed as a plurality of orifices, particularly holes or minute slits. Preferably, size, shape and/or location of the orifices can vary according to the design of the used mixing device, the used oxidizing agent, the used hydrocarbon fuel and/or their temperature. Most preferably, the oxidizing agent inlet is provided in the vicinity of the fuel inlet and between the fuel inlet side of the fuel reformer and the mixing device.

Another preferred embodiment of the fuel reformer is provided with a catalyst for the auto-thermal reaction inside the reaction chamber of the fuel reformer in order to accelerate the conversion of hydrocarbon fuel into hydrogen rich gas. Since the mixing is performed in accordance with the inventive method, a substantially completely homogenous mixture of the hydrocarbon fuel and the oxidizing agent can be brought into contact with the catalyst. Further, the substantially reduced condensation effects of the mixture or one of the components of the mixture achievable with the invention reduces substantially the risk of deactivation of the catalyst and thereby prolongs the life-time of the fuel reformer. Preferably, the catalyst can be a ceramic monolith or a metal grid.

Preferably, the distance between the mixing device and the catalyst in the reaction chamber of the fuel reformer is also constructed such that the oxidizing agent achieves mixture stabilization without causing auto-oxidation of the oxidizing agent/fuel mixture.

Further, a method for converting hydrocarbon fuel into a hydrogen rich gas according to the invention is provided, wherein one of the above described preferred embodiments of the fuel reformer is used for converting hydrocarbon fuel into hydrogen rich gas. The use of a fuel reformer comprising an embodiment of the inventive mixing device provides a homogenous mixing of the hydrocarbon fuel and the oxidizing agent. The achieved homogenous mixture allows for a substantially complete conversion of the hydrocarbon fuel which in turn allows for an efficient production of hydrogen rich gas from converted heavy hydrocarbon fuel which in turn is a prerequisite for the subsequent production of fuel cell grade hydrogen.

Other preferred embodiments and advantages are also provided.

In the following, preferred embodiments of the mixing device and the fuel reformer according to the invention will be discussed with help of the attached Figures. The description is considered as exemplification of the principles of the invention and is not intended to limit the scope of the claims.

Figure 1:
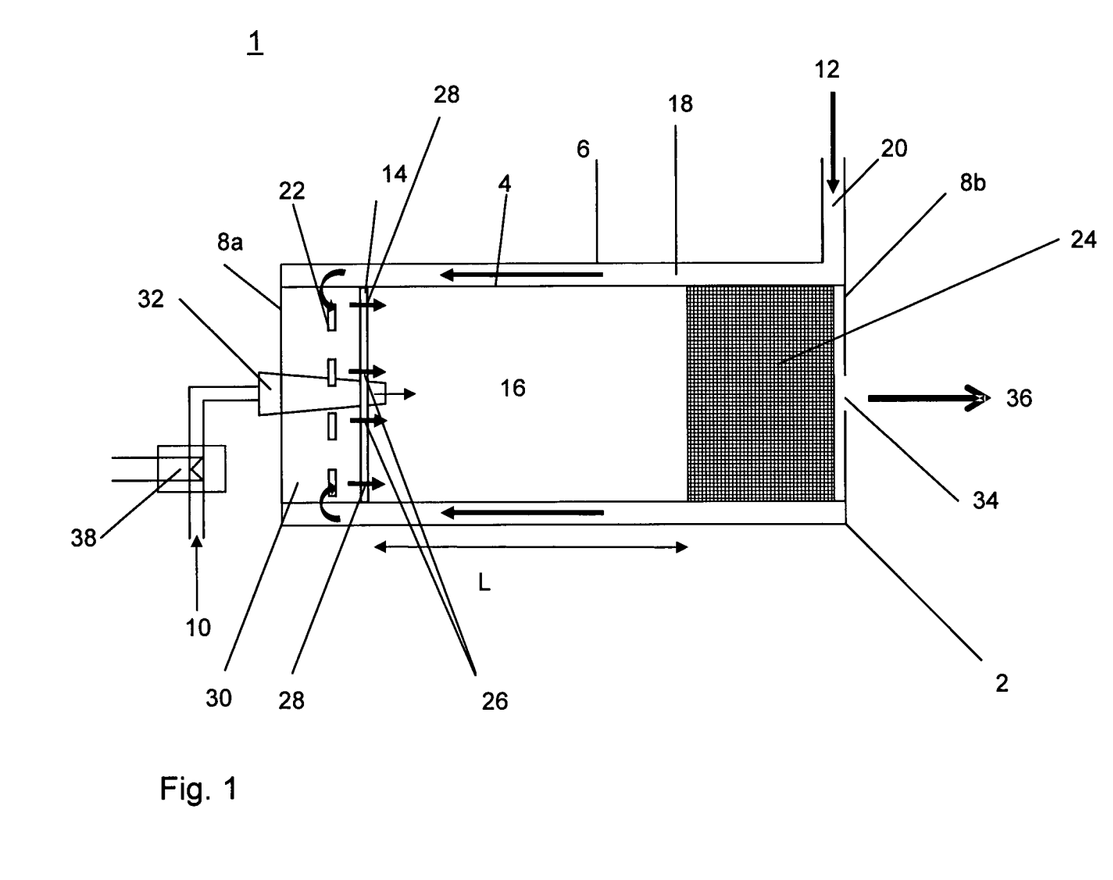
FIG. 1: a schematic view of a preferred embodiment of said fuel reformer according to the invention.

The fuel reformer 1 in FIG. 1 comprises a housing 2 with an inner wall 4, an outer wall 6 and side walls 8a, 8b. The housing 2 has a circular cross section (in relation to the longitudinal axis of the fuel reformer 1 stretching between the sidewalls 8a and 8b). Other forms of the cross section as for instance an elliptical or a quadratic or rectangular cross section are possible as well. Inside the housing 2, hydrocarbon fuel 10 and an oxidizing agent 12 are brought into contact with each other by means of a mixing device 14 so that a preferably auto-thermal reaction can take place in a reaction chamber 16 defined by the inner wall 4, the mixing device 14 and the side wall 8b.

The inner wall 4 and the outer wall 6 of the fuel reformer 1 define a space 18 between them. The space 18 in turn forms a passage for the oxidizing agent 12 between an oxidizing agent supply port 20 and one or more oxidizing agent inlets 22.

Additionally, the fuel reformer 1 includes a catalyst 24 for catalyzing the auto-thermal reaction in the reaction chamber 16. The catalyst 24 accelerates the auto-thermal reaction, but it is also possible to use a fuel reformer according to the present invention without such a catalyst. The catalyst 24 is preferably a metal grid or a ceramic monolith, but it is possible to use any other suitable substrate for the design of the catalyst 24.

The oxidizing agent inlet 22 is formed as a plurality of orifices, particularly as holes and/or minute slits, the number, size, shape and location of which vary depending on the used mixing device 14, the used oxidizing agent 12, the used hydrocarbon fuel 10 and the temperature of these fluids. The plurality of orifices 22 can have uniform size and shape, but it is also possible that the orifices vary in size and shape among each other. Preferably, the orifices are designed as slits 22 which are substantially equidistant, wherein also the length of the slits 22 is substantially equal to the distance between adjacent slits 22.

The mixing device 14 comprises a first plurality of holes 26 and a second plurality of holes 28, which are arranged along rows, preferably in form of concentric circles. The diameter of the circle of the first plurality of holes 26 is smaller than the diameter of the circle of the second plurality of holes 28. The oxidizing agent 12 streams through the slits 22 into a space 30, where a pressure will be generated by the incoming oxidizing agent 12, and is subsequently forced by said pressure through thβ first and the second plurality of holes 26, 28 in the mixing device 14 into the reaction chamber 16, where it mixes with the hydrocarbon fuel 10 that is injected into the reaction chamber 16 via a hydrocarbon fuel inlet 32. The design of the mixing device 14 will be explained in detail with reference to FIG. 2 to 4 below.

The distance L between the mixing device 14 and the catalyst 24 is also constructed in such a way that mixture stabilization of the oxidizing agent/fuel mixture is achieved by the oxidizing agent 12 without causing auto-oxidation of the oxidizing agent/fuel mixture.

Further, the hydrocarbon fuel inlet 32 at the fuel reformer is located in the side wall 8a of the housing 2 and extends through the mixing device 14 to the reaction chamber 16. Preferably, the hydrocarbon fuel inlet 32 is formed as a fuel injector which provides a fuel spray in the reaction chamber 16.

A reformer gas outlet 34 is provided in the opposite side wall 8b of housing 2. The reformer gas 36 is a hydrogen rich gas which can be used for operating fuel cells (subject to any necessary further processing as for instance cleaning and purification) and is the product of the auto-thermal reaction in the fuel reformer 1.

As shown in FIG. 1, the fuel reformer 1 further comprises a preheating means 38 for preheating the hydrocarbon fuel 10. In FIG. 1, the fuel preheating means 38 is illustrated as separate device, but it is also possible to integrate the fuel injector 32 and the fuel preheating means 38 into a single device. If the fuel injector 32 is additionally in heat conductive contact with the side wall 8a and/or the mixing device 14, heat generated in the reaction chamber 16 can be transferred to the fuel injector 32, where it can be used to preheat the hydrocarbon fuel 10.

In the following the operation of the fuel reformer 1 is described by means of the exemplary conversion of hydrocarbon fuel into hydrogen rich gas with an air/steam-mixture as oxidizing agent. The reaction for the conversion is auto-thermal.

According to the invention, air and steam are mixed before the air/steam-mixture 12 is injected by oxidizing agent supply port 20 into space 18, which serves as air/steam passage for transportation of the air/steam mixture 12 from the oxidizing agent supply port 20 to the oxidizing agent inlet 22 of the fuel reformer 1.

Dependent on the kind of reforming process (partially oxidizing, auto-thermal or steam reforming process), the direction of heat transfer between the air/steam mixture 12 and the inner wall 4 differs.

For auto-thermal or steam reforming processes for instance, preferably the air/steam mixture 12 is preheated by an external heating device (not shown), so that the hot air/steam mixture 12 can transfer heat to the inner wall 4. Thereby, particularly during the start-up phase, the reaction chamber 16 can easily be brought to, and kept at, its normal operating temperature.

In partial oxidation reforming processes, preferably, the air/steam-mixture 12 is preheated on the way to the slits 22 in the inner wall 4 of the housing 2 by heat transfer from the inner wall 4 to the air/steam mixture 12, whereby the heat transfer also cools the inner wall 4 of reaction chamber 16. By cooling the inner wall 4 of the reaction chamber 16, also the risk will be reduced that hydrocarbon fuel molecules in the reaction chamber 16 is being burned to soot when hitting the reaction chamber wall. The inner wall 4 of the reaction chamber 16 is heated by the substantially homogenous oxidation taking place in the reaction chamber 16 when oxygen from the air/steam-mixture 12 reacts with "lighter" hydrocarbon molecules of the hydrocarbon fuel 10 having shorter chains ($C_xH_y + O_2 \rightarrow CO_2 + CO + H_2O$).

During the start-up phase of the fuel reformer 1, oxidizing agent 12 as for instance the air/steam mixture 12 preheated by an external heater (not shown) can be supplied to the oxidizing supply port 20, which transfers its heat to the inner wall 4 and the catalyst 24, whereby the time for bringing the fuel reformer 1 to its normal operating temperature can be reduced.

The air/steam mixture 12 streams through the slits 22 into the space 30, where a pressure is generated which forces the air/steam mixture 12 through the holes of the mixing device 14 into the reaction chamber 16 of the fuel reformer 1. Thereby, a substantially homogenous air/steam mixture is formed in the reaction chamber 10, where it is mixed with hydrocarbon fuel 10 that is sprayed into the air/steam mixture by means of fuel injector 32.

For a successful mixing of the hydrocarbon fuel 10 and the air/steam mixture 12 a substantially perfect atomization or vaporization of the hydrocarbon fuel 10 into the air/steam mixture 12 is required in order to substantially keep any unwanted condensation of the hydrocarbon fuel 10 or the air/steam mixture 12 at a tolerable minimum. Since such an unwanted condensation likely occurs due to temperature differences between the preheated air/steam mixture 12 and the normally cooler hydrocarbon fuel 10, according to the embodiment of the invention shown in FIG. 1, also the hydrocarbon fuel 10 is preheated by the preheating means 38.

A substantially perfect fuel atomization or vaporization of the hydrocarbon fuel 10 and a subsequent mixture of the atomized or vaporized hydrocarbon fuel 10 with the air/steam mixture 12 is achieved by preheating the hydrocarbon fuel 10 to a temperature close to, but below the lowest boiling point of the hydrocarbon fuel 10, whereby also heat for a substantially complete atomization or vaporization is provided.

Preferably, also the air/steam mixture 12 is preheated to a temperature in the same temperature range or higher than the temperature of the hydrocarbon fuel 10, whereby an elevated temperature between the hydrocarbon fuel 10 and the air/steam mixture 12 is provided, which in turn substantially prevents condensation of the substances or at least keeps it at a tolerable minimum.

Since hydrocarbon fuel, and particularly diesel fuel, is a mixture of different components, whereby each of which has a different boiling point, the air/steam mixture 12 is preferably at least preheated to a temperature higher than the boiling point of the lightest components of the hydrocarbon fuel 10 which defines the lowest boiling point of the hydrocarbon fuel 10. However, it is more advantageous, to preheat the air/steam mixture 12 to a temperature that is higher than the highest boiling point of the hydrocarbon fuel 10. By preheating the air/steam mixture 12 to such a temperature a substantially complete vaporization of the hydrocarbon fuel 10 can be achieved.

The combination of fuel preheating and mixing the atomized hydrocarbon fuel 10 with the air/steam mixture 12 results in a substantially completely homogenous reactant mixture that allows for substantially complete conversion of the hydrocarbon fuel 10 into a hydrogen rich gas 36 which in turn allows for an efficient production of fuel cell grade hydrogen.

In order to provide a turbulent and homogenous mixture of the oxidizing agent 12 with the hydrocarbon fuel spray 10, the second plurality of holes 28 can further include shrouds which are designed to generate a swirling motion of the oxidizing agent 12 streaming through these holes. As a result, a substantially completely homogenous mixture of hydrocarbon fuel 10 and the oxidizing agent 12 is generated before this mixture comes into contact with the catalyst 24.

This substantially homogeneous gas mixture is then pushed through the catalyst 24, where the hydrocarbons of the hydrocarbon fuel 10 are undergoing the auto-thermal reaction process. In the auto-thermal reaction process taking place inside the catalyst hydrogen H2, CO and CO2 are produced as major process end products. These end products are processed in subsequent steps outside the fuel reformer 1 with the aim to separate H2 from all other process end products to such a degree that fuel cell grade hydrogen eventually is provided.

Figure 2:
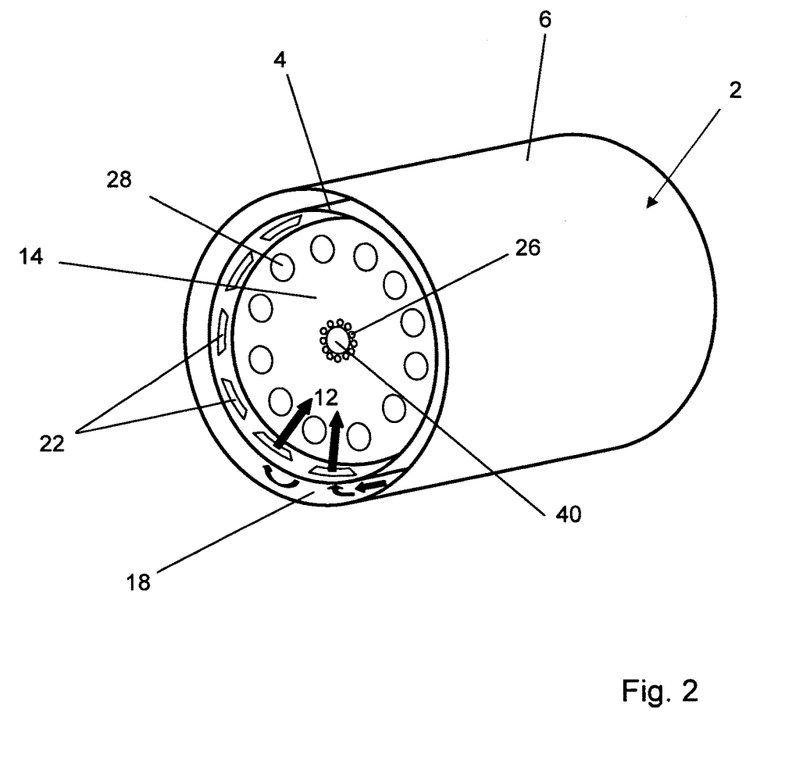
FIG. 2: a schematic perspective view of the fuel reformer shown in FIG. 1.

FIG. 2 shows a schematic perspective view of the reformer 1 illustrated in FIG. 1 from a perspective view from the fuel inlet side wall 8a, wherein the side wall 8a has been removed. As can be seen from the Figure, the mixing device 14 is arranged in a sealing manner inside the tubular shaped cylindrical reformer 1 and is mounted at the inner wall 4 of the housing 2 of the fuel reformer 1. As explained above, the oxidizing agent 12 streams through the space 18 formed between the inner wall 4 and the outer wall 6 of the housing 2 and enters the mixing device 14 in radial direction through the slits 22, which are arranged between the side wall 8a (not shown) and the mixing device 14.

The mixing device 14 has at least a first row of holes 26, which are preferably arranged along a first circle, and a second row of holes 28, which are preferably arranged along a second circle. Both circles are concentric to each other, and the first or inner circle has a smaller diameter than the second or outer circle. Preferably, the number of the first respectively second plurality of holes is equal, and the holes are arranged in an alternating manner that will be explained more in detail in connection with FIG. 4 further below.

It should be noted that the shape of the mixing device 14 resembles the cross-section of the fuel reformer 1. Therefore, a cylindrical or tubular fuel reformer with a circular or elliptical cross section results in a circular or elliptic shape of the mixing device. But it is also possible that reformer and mixing device have different shapes e.g. squared, rectangular or poly-angular.

The overall number of holes in the mixing device 14 also defines the diameter of the holes of the first plurality of holes 26 and the diameter of the holes of the second plurality of holes 28. The relation between the size of the holes, the radius of the circles and the number of holes will be explained with reference to FIG. 4 further below.

During the start-up phase, a major part of the oxidizing agent 12 (as for instance air/steam mixture) streams, after having entered the space 30 through slits 22, in radial direction to the first plurality of holes 26 and through these holes 26 as hot gas. Since the oxidizing agent 12 disperses in the space 30, a part of it also flows off through the holes 28 of the second plurality of holes, which are arranged along the outer edge of the mixing device 14. Since the plurality of holes 26 and 28 have effectively a smaller overall opening than the overall opening established by the plurality of slits 22, in the start-up phase of the operation of the fuel reformer 1 more oxidizing agent 12 flows into the space 30 than is drained off through the mixing device 14 via the holes 26 and 28. Therefore, the space 30 is gradually filled with oxidizing agent 12 and a pressure is established that forces the oxidizing agent 12 through the holes 26 and 28. In the steady-state, when the same amount of oxidizing agent 12 flows into the space 30 as is drained off through the mixing device 14, the oxidizing agent 12 streams through both the first plurality of holes 26 and the second plurality of holes 28, wherein due to smaller diameter of the holes of the first plurality of holes 26, the major part of the oxidizing agent 12 streams through the second plurality of holes 28.

In the centre of the mixing device 14 a receiving opening 40 is arranged which is adapted to accommodate, in a sealing manner, the fuel injection element 32. Preferably the receiving opening 40 has the same shape as, the fuel injection element 32.

Since the holes 28 of the second plurality of holes are off-set from the radial main stream direction of oxidizing agent 12 provided by the arrangement of the slits 22, it is ensured that the oxidizing agent 12 streams also through the first plurality of holes 26 during the start-up phase of the fuel reformer 1. If the slits 22 would be radially in line with the second plurality of holes 28, the main stream of oxidizing agent would stream directly through the second plurality of holes 28, such that the establishment of the desired plug flow is impaired or even blocked during the start-up phase.

The arrangement of holes is designed in such a way that, in the steady state of operation of the fuel reformer 1, a homogenous mixture of the hydrocarbon fuel 10 and the oxidizing agent 12 is achieved. The smaller sized holes of the first plurality of holes 26 ensure that the stream of oxidizing agent 12 does not disturb the fuel spray provided by the fuel injection element 32, and that the main mixing of the
hydrocarbon fuel 10 and the oxidizing agent 12 takes place with the oxidizing agent 12 streaming through the second plurality of holes 28. Thereby, the number, the size and the arrangement of the holes can be optimized for the used fuel reformer.

Figure 3:
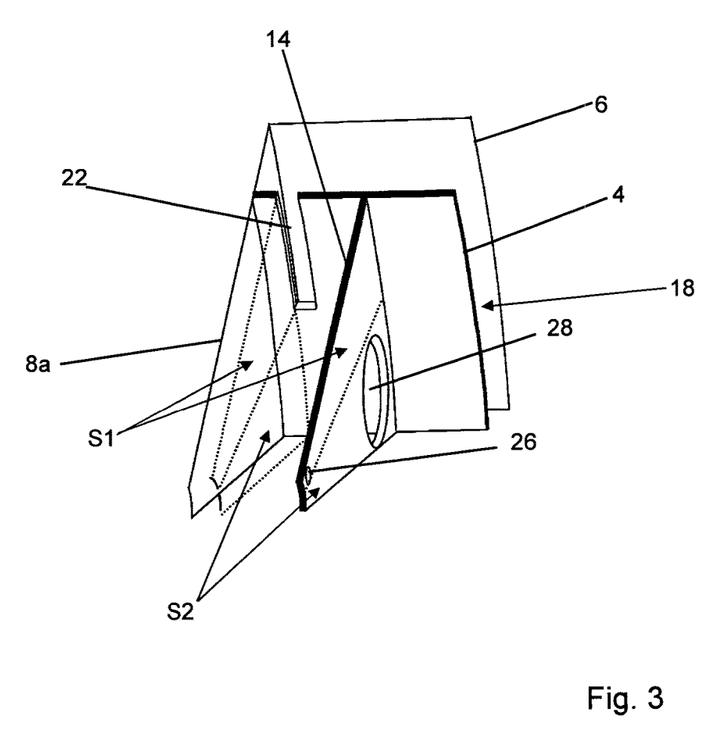
FIG. 3: a perspective view of a section of a preferred embodiment of the mixing device according to the invention.

A perspective view of a preferred arrangement of the slits and the holes of the first plurality of holes 26 and the second plurality of holes 28 is shown in FIG. 3.

FIG. 3 shows a perspective view of a sector having two segments S1 and S2 (indicated by the dotted lines) of the fuel reformer 1, with side wall 8a, inner wall 4, outer wall 6 and mixing device 14 (seen from the inside of space 30). As can be seen by the segments S1 and S2 indicated by the dotted lines in the Figure, the slit 22 and the hole 26 of the first plurality of holes are comprised in the first segment S1, wherein the hole 28 of the second plurality of holes is comprised in the second segment S2. It can further be seen in FIG. 2 that the slit 22 is arranged radially off-set to the hole 28 of the second plurality of holes (meaning that the slit 22 is radially not in line with the hole 28), wherein the hole 26 of the first plurality of holes is arranged in the same segment S1 as the slit 22 and therefore directly in the radial stream direction of the oxidizing agent 12 streaming through the slit 22 into the space 30.

As mentioned above, the size of the holes and slits and their arrangement is dependent on the overall number of holes. The diameter of the first plurality of holes 26 and/or the diameter of the second plurality of holes 28 are/is defined by the overall number of holes and the size of the mixing device 14. In the illustrated embodiment, the mixing device 14 is divided into segments S1 and S2, the sizes of which are defined by the overall number of holes, wherein in each segment, preferably alternating, either a hole of the first plurality of holes 26 or a hole of the second plurality of holes 28 is arranged. The details of these relations are illustrated in FIG. 4.

Figure 4:
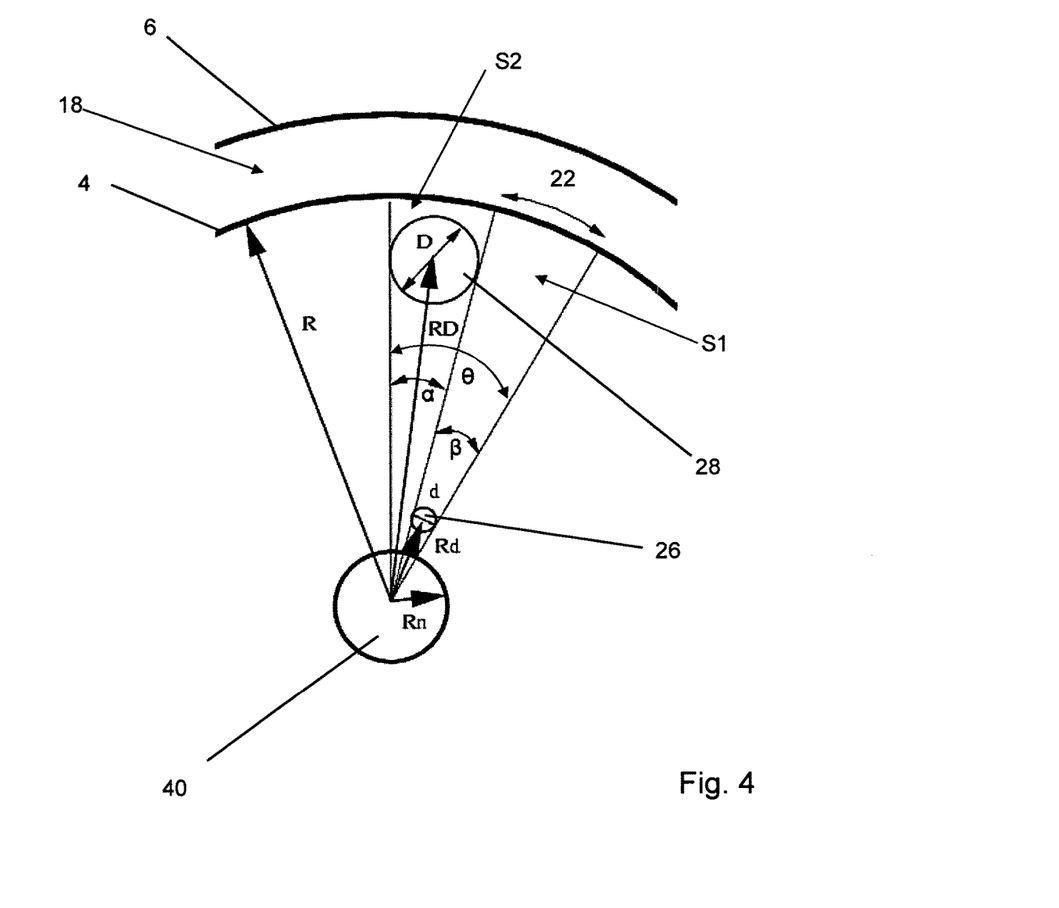
FIG. 4: a schematic view of the dimensions of a preferred embodiment of the mixing device according to the invention.

FIG. 4 shows a schematic front view of a part of the mixing device 14 having a radius R, which is mounted at the inner wall 4 of the fuel reformer. Between the inner wall 4 and the outer wall 6, the oxidizing agent passage 18 is defined. In the centre of the mixing device 14, the receiving opening 40 for the fuel injection element 32 having a radius Rn is arranged. The shape of the receiving opening 40 corresponds to the shape of the fuel injection element 32.

Along a first or inner circle with radius Rd, the first plurality of holes 26 having a diameter d are arranged (in FIG. 4 only a part of said circle with one of these holes 26 is shown). Along a second or outer circle with radius RD, the second plurality of holes 28 having a diameter D are arranged (in FIG. 4 only a part of said circle with one of these holes 28 is shown).

The number of holes ni of the first plurality of holes 26 and the number of the holes n2 of the second plurality of holes 28 are preferably equal. The overall number of holes N=n2+ni defines an angle $\theta$ by using the formula $\theta=360°/N$, wherein $\theta$ is defined by the sum of $\alpha+\beta$. The angles $\alpha$ and $\beta$ are the angles of the segments S1 and S2 each comprising either a hole 28 of the second plurality of holes or a hole 26 of the first plurality of holes, respectively, wherein $\alpha$ and $\beta$ need not to be equal. The angle $\theta$ divides the mixing device 14 into equally sized sectors (comprising each a segment of the type S1 and a segment of type S2 as described in FIG. 3), wherein each sector comprises a pair of holes, namely a hole 26 of the first plurality of holes and a hole 28 of the second plurality of holes.

According to a preferred embodiment, the size and arrangement of the holes can be defined by the relation that the ratio of the diameter d of one of the first plurality of holes 26 to the radius Rd of the first circle is proportional to tan ($\beta$/2) and/or the ratio of the diameter D of one of the second plurality of holes 28 to the radius RD of the second circle is proportional to tan ($\alpha$/2).

It should be noted that the radius RD of the second circle is also limited by the overall size of the mixing device 14 given by the radius R of the mixing device. The radius RD can be defined by e.g. calculating the apothem of a triangle given by the radius R of the mixing device 14 and the angle $\alpha$. The radius RD is then proportional to R according to the formula $RD=R(1-\sin(\alpha/2))\tan(\alpha/2)$.

In the embodiment of the invention shown in FIGS. 2-4 the slits 22 are arranged at the segments comprising the holes 26 of the first circle, and their length is proportional to $2\pi R \beta/360°$.

It should be noted in this context that not only two rows or circles of holes can be arranged at the mixing device 14, but it is also possible to arrange three or more such rows of holes at the mixing device 14. Also the concentric arrangement is only a preferred arrangement. It is also possible to arrange the holes homogenously distributed over the mixing device 14 (similar to a sieve) or along a planar spiral starting near the hole 40 for the fuel injection element 32 and continuously expanding on the mixing device 14 outwardly towards the inner wall 4 of the housing 2.

The shown embodiment is optimized for reducing recirculation of the mixed fluids 10 and 12 due to a repulsion of the mixture from the catalyst 24, since the illustrated design of the mixing device 14 establishes a plug flow in the reaction chamber 16 of the fuel reformer 1, which reduces recirculation. For a further improvement of the mixture the holes of the second plurality of holes 28 can further comprise shrouds (not shown) which provide in the reaction chamber 16 downstream of the mixing device 14 a swirling motion of the oxidizing agent 12 streaming through the holes 28. This swirling motion increases the homogeneity of the mixture of the hydrocarbon fuel spray 10 and the oxidizing agent 12.

Another advantage of the inventive mixing device 14 is that the oxidizing agent 12 streaming through the holes 26 of the inner circle is hot. Therefore, the heat of the oxidizing agent 12 can also be used to heat the hydrocarbon fuel 10. Thereby, also condensation of the mixed fluids 10, 12 can be reduced.

Even if the mixing device is described in the context of the mixing of hydrocarbon fuel and an oxidizing agent, the mixing device can also be used for the mixing of other fluids. Another possible application is for example given as mixing device for the (separate) mixture of air and steam for providing the air/steam mixture which then in form of a mixture is introduced as oxidizing agent into the fuel reformer.

REFERENCE LIST 1 fuel reformer
2 housing
4 inner wall
6 outer wall
8a, b sides faces
10 hydrocarbon fuel
12 oxidizing agent
14 mixing device
16 reaction chamber
18 space=oxidizing agent passage
20 oxidizing agent supply port
22 oxidizing agent inlet
24 catalyst
26 first plurality of holes
28 second plurality of holes
30 space for the oxidizing agent
32 hydrocarbon fuel inlet
34 hydrogen rich gas outlet
36 hydrogen rich gas
38 preheating means
40 receiving opening

The invention claimed is:

1. A fuel reformer for converting hydrocarbon fuels into a hydrogen rich gas for fuel cells and/or exhaust treatment applications comprising:
   a housing with two side walls forming a reaction chamber of the fuel reformer in which hydrocarbon fuel and an oxidizing agent are mixed for converting hydrocarbon fuel into hydrogen rich gas;
   a feel injection element for providing the hydrocarbon fuel into the reaction chamber;
   an oxidizing agent inlet for providing the oxidizing agent into the reaction chamber,
   a mixing device arranged downstream of the oxidizing agent inlet for mixing the hydrocarbon fuel and the oxidizing agent,
   wherein the mixing device is a plate having substantially a same shape as a cross-section of the fuel reformer and comprises a receiving opening which is adapted to accommodate the fuel injection element, and, for introducing the oxidizing agent, comprises at least a first plurality of holes which is arranged along a first row, and a second plurality of holes which is arranged along a second row,
   wherein the diameters of the first plurality of holes are smaller than the diameters of the second plurality of holes,
   wherein the mixing device is arranged substantially parallel to the side walls and provides an axial oxidizing agent fluid flow along a longitudinal axis of the fuel reformer, and
   wherein the oxidizing agent is positioned upstream of the mixing device.

2. Fuel reformer according to claim 1, wherein the second plurality of holes arranged along the second row is equipped with shrouds for providing, in an outer part of the reaction chamber, a swirling motion of the oxidizing agent entering the reformer chamber through the second plurality of holes and/or the hydrocarbon fuel.

3. Fuel reformer according to claim 1, wherein the fuel injection element is provided in one of the two side walls of the housing f, and the mixing device is arranged in the vicinity of this fuel inlet side wall, and wherein the oxidizing agent inlet is arranged between the mixing device and the side wall of the housing at which the fuel inlet is arranged.

4. Fuel reformer according to claim 1, comprising preheating means arranged to preheat the hydrocarbon fuel to a temperature roughly below a lowest boiling point of the fuel.

5. Fuel reformer according to claim 1, wherein the oxidizing agent inlet is designed as a plurality of orifices, particularly holes and/or slits, introducing the oxidizing agent into a space arranged in the housing of the fuel reformer, which is defined between the fuel inlet side wall of the housing and the mixing device, wherein the plurality of orifices are arranged at segments (S1) of the mixing device, which comprise a hole of the first plurality of holes.

6. Fuel reformer according to claim 5, wherein size and/or shape and/or location of the plurality of orifices depend on the used mixing device and/or the used hydrocarbon fuel and/or the used oxidizing agent.

7. Fuel reformer according to claim 1, wherein the fuel reformer further comprises an inner wall and an outer wall forming a space in-between, wherein the space is designed as oxidizing agent passage between an oxidizing agent supply port provided in or at the outer wall and the oxidizing agent inlet provided in or at the inner wall, and wherein the oxidizing agent supply port and the oxidizing agent inlet are arranged opposite to each other at or near the opposite sides walls of the housing of the fuel reformer.

8. Fuel reformer according to claim 1, wherein the inner wall is arranged to preheat the oxidizing agent to a temperature in substantially the same temperature range, or to a temperature higher, than the temperature of the hydrocarbon fuel, wherein the preheating of the oxidizing agent is provided by the inner wall.

9. Method for converting hydrocarbon fuels into a hydrogen rich gas for fuel cells and/or exhaust treatment applications comprising using a fuel reformer according to claim 1.

10. Fuel reformer according to claim 1, wherein the first and/or second row/s are substantially arranged on a line, and the first and/or second row/s are formed as circles or ellipses.

11. Fuel reformer according to claim 10, wherein the first and second rows are formed as first and second circles, respectively, and wherein the radius (Rd) of the first circle is smaller than the radius (RD) of the second circle, wherein the first and second circles are substantially arranged as concentric circles.

12. Fuel reformer according to claim 1, wherein the number of the first plurality of holes is the same as the number of the second plurality of holes.

13. Fuel reformer according to claim 1, wherein the diameters of the first plurality of holes are substantially equal and/or the diameters of the second plurality of holes are substantially equal.

14. Fuel reformer according to claim 1, wherein the diameter of the first plurality of holes and/or the diameter of the second plurality of holes is determined by the overall number of holes and the size of the mixing device.

15. Fuel reformer according to claim 14, wherein the ratio (d/Rd) of the diameter of one of the first plurality of holes to the radius of the first circle is substantially proportional to $\tan(\beta/2)$ and/or the ratio (D/RD) of the diameter of one of the second plurality of holes to the radius of the second circle is substantially proportional to $\tan(\alpha/2)$, wherein the angle β defines a first type of segment (S1) which comprises a hole of the first plurality of holes and wherein the angle α defines a second type of segment (S2) which comprises a hole of the second plurality of holes, and wherein n1·α+n2·β is substantially equal to 360°, with n1 being the number of holes of the first plurality of holes and n2 being the number of holes of the second plurality of holes.

16. Fuel reformer according to claim 1, wherein the mixing device is divided into equal segments, which size is determined by the overall number of holes, wherein in each segment, either a hole of the first plurality of holes or a hole of the second plurality of holes is arranged.

17. Fuel reformer according to claim 1, wherein the receiving opening has the same shape as the fuel injection element.

18. Fuel reformer according to claim 1, wherein the plate is planar.

19. Fuel reformer according to claim 1, wherein the fuel reformer is cylindrically shaped having a circular or elliptical cross section.

* * * * *